April 16, 1946.  H. G. ROGERS  2,398,506
LIGHT POLARIZER AND METHOD OF MANUFACTURE
Filed Dec. 24, 1940  6 Sheets-Sheet 1

Howard G. Rogers
INVENTOR.
BY Donald L. Brown
attorney

April 16, 1946. H. G. ROGERS 2,398,506
LIGHT POLARIZER AND METHOD OF MANUFACTURE
Filed Dec. 24, 1940 6 Sheets-Sheet 2

Howard G. Rogers
INVENTOR.
BY Donald L. Brown
Attorney

April 16, 1946.  H. G. ROGERS  2,398,506

LIGHT POLARIZER AND METHOD OF MANUFACTURE

Filed Dec. 24, 1940  6 Sheets-Sheet 3

Howard G. Rogers
INVENTOR.

BY Donald L. Brown
Attorney

April 16, 1946.  H. G. ROGERS  2,398,506
LIGHT POLARIZER AND METHOD OF MANUFACTURE
Filed Dec. 24, 1940  6 Sheets-Sheet 4

Howard G. Rogers
INVENTOR.
BY Donald L. Brown
Attorney

April 16, 1946.   H. G. ROGERS   2,398,506
LIGHT POLARIZER AND METHOD OF MANUFACTURE
Filed Dec. 24, 1940   6 Sheets-Sheet 5

Howard G. Rogers
INVENTOR.
BY Donald L. Brown
Attorney

April 16, 1946. H. G. ROGERS 2,398,506
LIGHT POLARIZER AND METHOD OF MANUFACTURE
Filed Dec. 24, 1940 6 Sheets-Sheet 6

Howard G. Rogers
INVENTOR.
BY Donald L. Brown
Attorney

Patented Apr. 16, 1946

2,398,506

UNITED STATES PATENT OFFICE 2,398,506

LIGHT POLARIZER AND METHOD OF MANUFACTURE

Howard G. Rogers, Brookline, Mass., assignor to Polaroid Corporation, Dover, Del., a corporation of Delaware Application December 24, 1940, Serial No. 371,561

29 Claims. (Cl. 88—65)

This invention relates to new and improved light polarizers and to methods of manufacturing the same.

An object of the invention is to provide an exceedingly thin, molecularly oriented plastic film, and more particularly a light-polarizing film or layer, bonded to a transparent supporting plate.

Other objects of the invention are to provide an article of the character described in which the thickness of the plastic film is not greater than a few microns; in which the concentration of light-polarizing material in said film is very high; in which the film comprises a linear, hydrophilic, high polymeric plastic, and more particularly one having substantially oriented dichroic molecules; in which the light-polarizing film comprises treated polyvinyl alcohol; in which the transparent support comprises glass or a relatively hard plastic of any predetermined shape, and more specifically having a curved or spherical surface to which the polarizing film is applied; and in which the light-polarizing film is bonded to the supporting plate without the use of additional adhesive.

Other objects of the invention are to provide a plastic film of the character described bonded to a supporting surface, the film comprising a multiplicity of contiguous, coalesced, tegulated or squamose flakes of the plastic, the flakes having been coalesced by the heat of friction at least in part, the molecules of the flakes of the plastic material being substantially oriented in the direction of the application of the frictional force which coalesced the flakes; to provide such a plastic layer or film comprising a plurality of overlying, separately formed films of coalesced flakes of the plastic, the films being bonded together; to provide such a plastic layer or film having a thickness not exceeding 0.0002 inch; and to provide such a plastic layer or film in the form of a light-polarizing sheet bonded to a supporting plate.

Still further objects of the invention are to provide a method for the formation of an article of the character described wherein an exceedingly thin layer of substantially oriented, linear, hydrophilic, polymeric plastic material the molecules of which contain hydroxyl groups, and more specifically polyvinyl alcohol, is deposited or formed upon the surface of a supporting element; to provide such a method wherein the molecular orientation of the plastic is effected simultaneously with the deposition or formation of the plastic layer upon the support; to provide such a method wherein the deposition of the plastic layer upon the support and the orientation of the deposited plastic are accomplished by frictional engagement between the plastic and the support; to provide a method whereby the plastic layer is formed upon the support by the successive deposition upon the support of thin, small, contiguous flakes or areas of said plastic; to provide a method wherein said flakes are coalesced to form a sheet or film as they are deposited upon the support; to provide a method for the deposition of the thin, molecularly oriented, plastic layer on the support under such conditions that the layer is bonded to the support without added adhesive; to provide methods for converting said deposited layer or film into a light-polarizing layer or film; and to provide, in connection with such methods, catalyzers for facilitating the conversion of the deposited film to a light-polarizing film.

Other objects of the invention will in part be obvious and will in part appear hereinafter.

The invention accordingly comprises the several steps and the relation of one or more of such steps with respect to each of the others, and the article possessing the features, properties and the relation of elements which are exemplified in the following detailed disclosure and the scope of the application of which will be indicated in the claims.

For a fuller understanding of the nature and objects of the invention, reference should be had to the following detailed description taken in connection with the accompanying drawings, in which.

Figure 21:
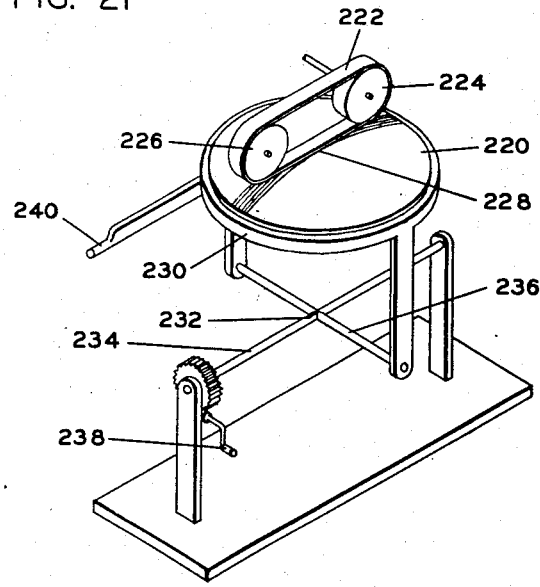
Fig. 21 is a diagrammatic representation of means for mounting a spherically curved support for movement with respect to a device such as is shown in Fig. 13 for forming thereon the thin film of the present invention.
Figure 23:
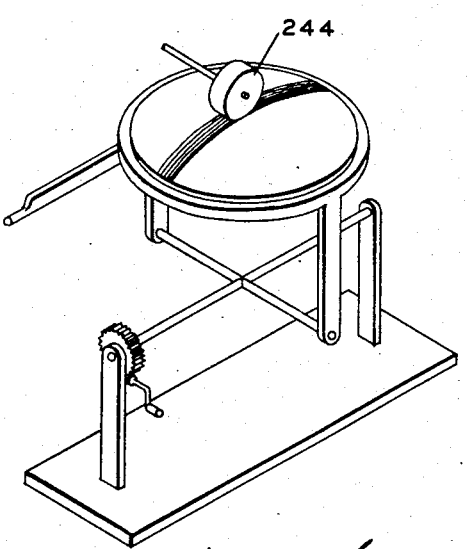
Figure 24:
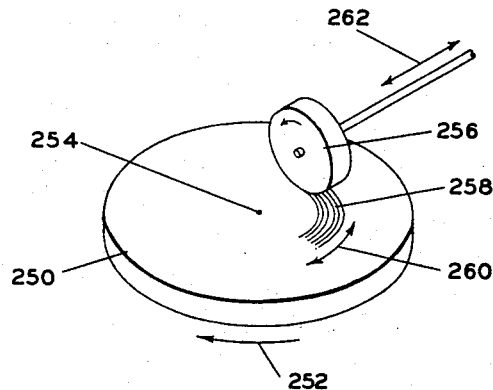
Figure 25:
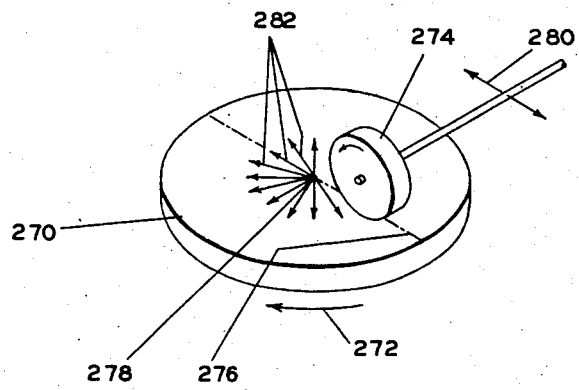

Fig. 23 is a view similar to Fig. 21 illustrating how the devices shown in Figs. 2 to 11 inclusive may be employed to coat the surface of a suitably mounted spherical support; and Figs. 24 and 25 are diagrammatic representations respectively of apparatus for forming on a transparent support a light-polarizing film in which the transmission axis is parallel to circles concentric about a predetermined point in the surface of the support (Fig. 24) or in which the transmission axis of the film is parallel to straight lines radiating from a predetermined point in the surface of the support (Fig. 25).

In United States Patent No. 2,173,304, to Edwin H. Land and Howard G. Rogers, granted September 19, 1939, for Light polarizer, there is disclosed a light-polarizing material in sheet form comprising a substantially molecularly oriented, linear, polymeric plastic such for example as polyvinyl alcohol which has been so treated that certain of the molecules thereof have been converted into polyvinylene, a dichroic alteration product of polyvinyl alcohol.

The polarizer described and claimed in the said patent is admirably adapted for use as a light-polarizing headlight filter or screen in connection with automobile illumination systems employing polarized light. With the development of the so-called "sealed beam" headlight, it has been found desirable to affix the polarizing film which is to be associated with the headlight to the outer surface of the headlight lens. The surface is spherically curved and difficulty has been encountered in bonding to such a surface preformed sheets of light-polarizing material. While suitable bonds have been attained, the application of the sheet material to the curved surface of the headlight has given rise frequently to a shift in the transmission axis of the polarizing sheet over portions of the area thereof, with the result that a headlight lens to which a sheet of the polarizing material has been affixed shows, when illuminated and viewed through an analyzer, a distinct pattern unless great care is taken in effecting the bond. Maximum extinction occurs over portions of the headlight lens when the analyzer is in a predetermined position, and over other portions of the lens when the analyzer is rotated from said position to another position.

A principal object of the present invention is to provide a coating of light-polarizing material of the type for example described and claimed in the said Patent No. 2,173,304 on a curved headlight lens, the coating being applied in such a way that no shift in the transmission axis of the polarizing material is visible over the entire lens surface.

The present invention, furthermore, contemplates the provision of a process which results in the formation of a film or layer of material which is exceedingly thin, for example approximately 0.00015 inch in thickness, and in which the light-polarizing material is highly concentrated. Such a thin film or layer is highly desirable. Its absorption for the transmitted component of the incident beam of light is maintained at a minimum and its efficiency as a polarizer is thus great.

A great variety of means and methods may be employed to form the thin film of oriented plastic material, for example polyvinyl alcohol, polyvinyl acetal or the like, on the surface of a suitable support. The drawings illustrate many devices for accomplishing this result. The supporting plate may be either flat or curved and the device from which the plastic material is deposited onto the plate may or may not conform generally to the surface of the support which is to be coated.

Speaking generally, the preferred process is one which brings into contact with the support to be coated a mass or masses of the plastic material in any desired form, for example as a single bar or disk, or as a succession of smaller plates, rods, disks, filaments, or the like, which are wiped across or smeared against the surface of the supporting plate under such conditions that a thin film of the plastic is deposited upon the support from the plastic mass or masses brought into contact therewith. Where a succession of units of the plastic material are brought into contact with the surface to be coated, means are preferably provided for moving either the supporting plate or the plastic units relatively to one another so that a succession of contiguous flakes or smears of the plastic material are deposited from the plastic units onto the supporting plate. The deposit of these flakes or smears may continue until the desired surface of the supporting plate is covered with a thin film of the plastic. The flakes may preferably be so deposited that successive ones may be described as tegulated and the entire surface may be described as coated with flakes which are in a squamose condition.

Preferably, localized heat should be generated at the point of contact between the plastic and the support, and this should preferably be in the neighborhood of from 125 degrees to 175 degrees C. This aids in the removal of the material from the plastic mass, in coalescing adjacent flakes of deposited plastic, and in causing adhesion of the removed material to the support. In many of the devices shown in the drawings, such a localized heat may be developed by frictional contact between a rapidly rotating plastic mass and the surface of the support. In others of the devices shown in the drawings, the support itself may be pre-heated, as for example in the device shown in Fig. 1, where the likelihood of a high local heat resulting from friction between the plastic and the support is remote.

The smearing or wiping action between the plastic and the support should preferably be in one direction so that as the material is deposited on the support a molecular orientation is effected in the deposited layer and in the direction of the smearing or wiping action.

In one form of the invention a plurality of very thin, overlying films of the plastic material are formed on the support successively. Under some circumstances, each film may be processed in the manner hereinafter to be explained to render it light-polarizing before the next succeeding film is applied thereto. For example, a composite layer or film having a total thickness of approximately 0.00015 inch may be built up in this manner by the superimposition of a plurality of thinner layers. It is to be understood, however, that satisfactory results have been secured with the deposit of a single layer and, furthermore, that the final deposit may be substantially thicker than the layer already described. Speaking generally, it is not desirable that the deposited layer in its final form have a thickness much greater than 0.0005 inch.

While the deposited films of the present invention are admirably adapted for the formation of a light-polarizing film of the type shown and described in the said United States Patent No. 2,173,304, they are also adapted for use in the formation of other types of light-polarizing dichroic films, as will hereinafter be explained.

Figure 1:
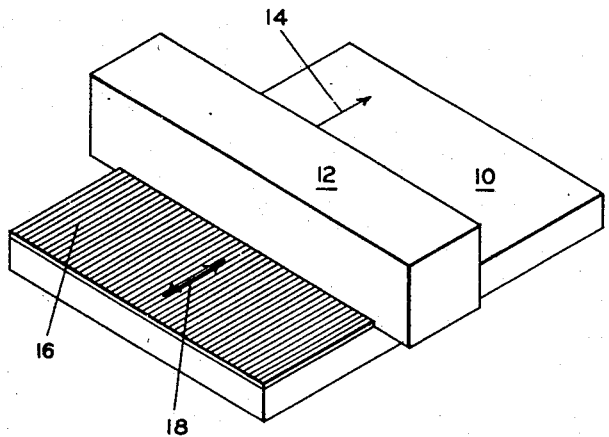
Figure 1 is a diagrammatic representation in perspective of means for forming the product of the present invention.

A simple apparatus for the formation of the product of the present invention is shown in Fig. 1 wherein 10 represents a suitable supporting plate, for example a plate of glass or other light-transmitting material such as a sheet of a plastic or the like, and wherein 12 represents a mass of polyvinyl alcohol or other suitable plastic, for example a linear, hydrophilic, high polymeric plastic, the molecules of which contain hydroxyl groups. This mass of polyvinyl alcohol or other plastic may be of any shape and the surface of contact between it and the support may be of any shape, i. e., either flat, curved or pointed. The polyvinyl alcohol mass may be manually pressed against the supporting plate, which is preferably heated to a temperature of approximately 150 degrees C., and the plastic mass 12 may then be smeared or wiped across the surface of the plate, for example in the direction indicated by the arrow 14. As a result, there is deposited upon the surface of the plate, over the area of contact with the mass 12, a thin film or layer 16. This layer is adherent to the surface of the plate 10 and its molecules are substantially oriented in the direction of the arrow 18, for example. This direction will coincide substantially with the direction in which the element 12 has been moved across the plate 10.

It will be understood that the element 12 may be fixedly positioned and the plate 10 moved with respect thereto, or both the elements 10 and 12 may be moved, the direction of relative motion between them determining the direction of molecular orientation in the deposited layer 16.

The support 10 with the coating 16 thereon may then be subjected to an additional baking process at a somewhat higher temperature, for example a temperature between 175 degrees and 200 degrees C., and the film or layer 16 converted into the type of polarizer described and claimed in Patent No. 2,173,304.

So also, acid accelerators, such for example as solutions of sulphuric acid or hydriodic acid, or accelerator salts, such as ammonium iodide, ferric chloride or sodium bisulfate, or other suitable accelerators, may be employed and the film 16 dipped therein before the additional heating. Under these circumstances the polarizing stain is produced in the film at a somewhat lower temperature. The process may then be repeated and additional layers laid down on the surface of the layer 16 until the desired density of the polarizing film on the surface of the support 10 has been attained.

It is also to be understood that several successive layers of oriented plastic material may be laid down, one upon the other, and the composite layer then treated in the manner indicated, or otherwise, as hereinafter described, to convert it into a polarizing film.

Figure 2:
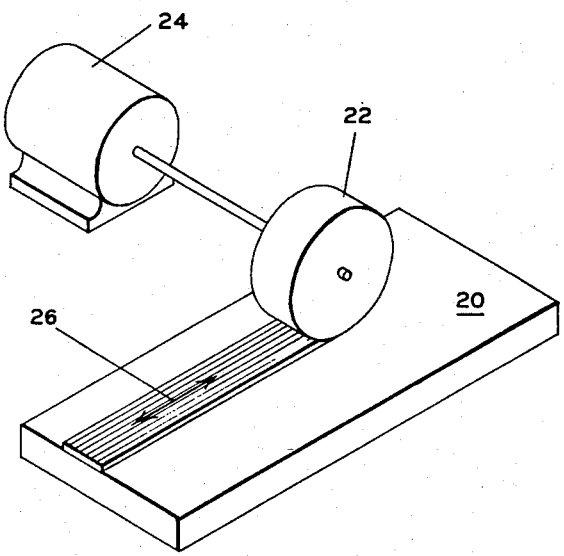
Figure 2 is a similar view of other apparatus for forming the product of the present invention.

In Fig. 2 a modified form of the invention is disclosed. Here the support 20 has the layer of oriented plastic material applied to its surface by being brought into contact with the rapidly rotating disk 22 of polyvinyl alcohol or other suitable plastic. If the rotating disk 22 and its driving motor 24 are held relatively stationary, the entire surface of the support 20 may be coated with a suitable film by moving the support beneath the disk longitudinally and transversely, or if the support is stationary, the disk and its driving mechanism may be similarly moved with respect to the surface to be coated so that all portions thereof come in contact with the rotating disk, or both the support and the rotating disk may be moved. With a device of this kind, sufficient local heat is generated by friction between the rotating disk and the support to effect an initial bonding of the deposited film on the surface of the support and a coalescing of adjacent areas of the deposited plastic film.

Satisfactory results have been obtained with devices of this kind in which the surface speed of the disk against the support is, for example, between 1,000 feet per minute and 2,500 feet per minute and in which the support is fed past the disk at from 10 feet to 75 feet per minute. Under these circumstances the disk may be pressed against the support lightly so as to leave deposited thereon the thin coatings of the character described. The direction of orientation of the molecules of the deposited film will be, as is indicated by the arrow 26, substantially parallel to the direction in which the rotating disk rubs or smears against the surface of the support, and with the speeds mentioned above, lateral motion of the support with respect to the disk will have little, if any, effect upon the direction of orientation of the molecules of the deposited film.

The disk 22 shown in Fig. 2 is illustrated as a solid disk of polyvinyl alcohol or other suitable plastic. It is to be understood that it may be made up of many modified forms and that wide variations may be employed in devices of this kind for bringing polyvinyl alcohol into wiping contact with the surface to be coated. The disk may be, for example, a composite of thin, sheet-like disks held together along the shaft of the motor, or the rotating, disk-like element may take any of the many forms and modifications shown in Figs. 3 to 11 inclusive.

Figure 3:
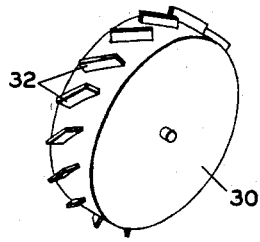
Figures 3, 4, 5, 6, 7, 8, 9, 10 and 11 are similar views of modifications of one of the elements of the apparatus shown in Fig. 2.

In Fig. 3 there is shown a disk 30 of any suitable material such, for example, as wood, fibre, metal or the like, having affixed in its periphery a plurality of outwardly extending, angularly positioned fins or flaps of polyvinyl alcohol 32. When a disk of this type is substituted for the element 22 in the apparatus shown for example in Fig. 2, rotation of the disk 30 will bring into contact with the surface of the supporting plate 20 a succession of units or masses of polyvinyl alcohol 32 each of which will make relatively brief contact with the surface of the supporting plate 20. As each of the elements 32 comes in contact with the surface of the supporting plate, a smear or flake of polyvinyl alcohol is wiped from the edge of the element 32 and deposited upon the surface of the supporting plate. As the plate is moved relatively to the rotating disk, successive flakes from successive plastic elements 32 are deposited in a tegulated manner. These flakes are contiguous. They may overlie each other in part at least. The locally generated heat of friction may be sufficient not only to cause the deposition of the individual flakes but cause successive and contiguous flakes to coalesce into a uniform thin film. The direction of the application of the frictional force causing the coalescing of contiguous plastic smears or flakes on the surface of the support 20 will determine the direction of orientation of the molecules of the plastic in the deposited smears or flakes and hence in the deposited layer as a whole.

Figure 4:
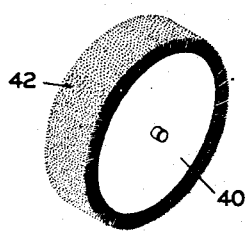

In Fig. 4 the disk 40 has mounted therein a multiplicity of relatively short, stiff bristles 42 of polyvinyl alcohol or other suitable plastic. These bristles may be formed by extruding the plastic. They should preferably be of sufficient diameter and of such length as to present a fairly rigid, stiff surface to the support against which the disk is to be rotated.

Figure 5:
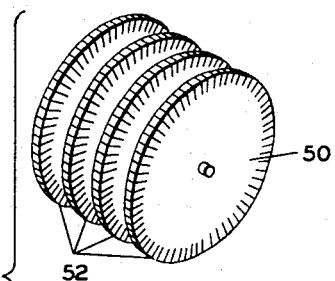

Fig. 5 illustrates a still further modification of the apparatus which may be employed in the practice of the invention. Here the disk comprises a multiplicity of thin, separate sheets 50 of the plastic material such for example as were described previously in connection with a modification of the device shown in Fig. 2. In the device shown in Fig. 5, however, the periphery of each disk is notched as at 52, the notches being arranged in such a way that when the disks are assembled in the manner shown the notches are staggered.

Figure 6:
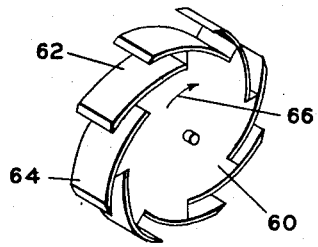

Fig. 6 illustrates a still further modification of the device which may be used. Here segments have been cut from the surface of the disk 60, as for example at 62, and flaps of polyvinyl alcohol 64 have been affixed to the surfaces of these segments so that the flaps extend from the disk much in the manner of the blades of a paddle wheel. It is intended, with a device of this kind, that the disk be rotated in the direction indicated by the arrow 66.

Figure 7:
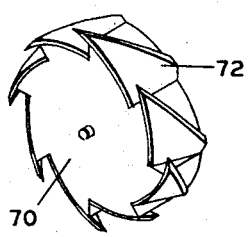

Fig. 7 illustrates a modification of the device shown in Fig. 6. Here the segments cut from the periphery of the disk 70 have been so shaped that the edges of the plastic flaps 72 mounted in the disks strike the surface of the supporting plate against which the disk is rotated angularly as do the plastic flaps 32 in Fig. 3.

Figure 8:
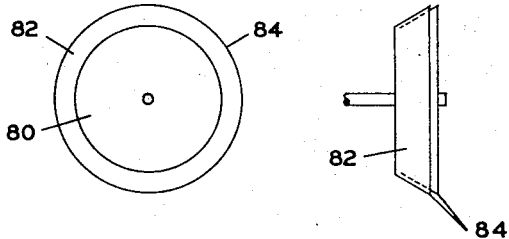

A still further modification is shown in Fig. 8. Here the rotating disk 80 is frustro-conical in shape and one or more overlying sheets of polyvinyl alcohol 82 are affixed to the surface thereof in such manner that as the disk rotates the edges 84 of the plastic sheets make contact with the surface of the supporting plate.

Figure 9:
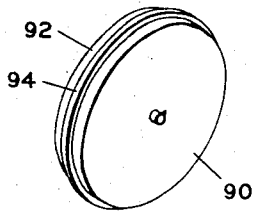

In the modification of the device shown in Fig. 9, the disk comprises two sections 90 and 92 which have mounted therebetween a flat disk 94 of polyvinyl alcohol, the periphery of which extends out beyond the peripheries of the elements 90 and 92.

Figure 10:
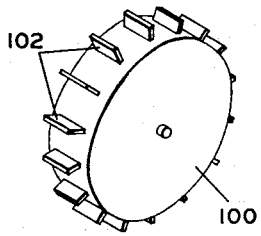

In Fig. 10 there is shown a modification of the device shown in Fig. 3. In Fig. 10 the disk 100 has mounted in its periphery a plurality of outwardly extending flaps or plates 102, the outer edges of which are substantially parallel to the axis of rotation of the disk.

Figure 11:
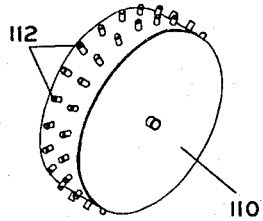

In Fig. 11 there is shown a modification of the device shown in Fig. 4. The disk 110 has protruding from its periphery a multiplicity of heavy, spaced, rod-like elements 112 of polyvinyl alcohol or other suitable plastic material which are forced into contact with the surface of the support as the disk is rotated.

It will be understood that the modifications shown in the figures just described are illustrative of devices which may be employed in the practice of the present invention. They are, however, to be deemed in no way exclusive of other modifications which fall within the scope of the claims.

Figure 12:
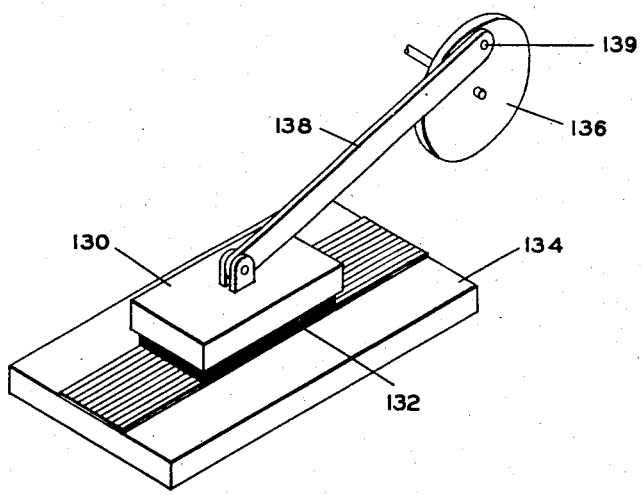
Fig. 12 is a diagrammatic representation in perspective of still other apparatus for forming the product of the present invention.

Fig. 12 illustrates a modified form of apparatus for practicing the present invention, in which a flat brush member 130 provided with extending bristles or the like 132 of a suitable plastic, is driven back and forth across the surface of the supporting plate 134 by means of the rotating disk 136 to which there is affixed the shaft or arm 138, for example by means of pin 139. As the brush is scrubbed lightly over the face of the support, a satisfactory thin deposit of oriented plastic material may be obtained. With a device of this kind the heat generated by the friction between the brush and the surface of the support may be insufficient for the purpose of the practice of the invention, in which case the supporting plate may be heated as previously explained.

Figure 13:
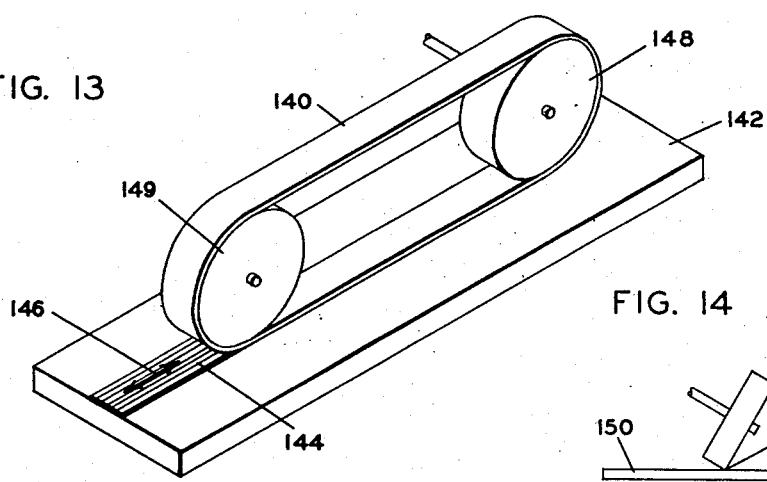
Fig. 13 is a view similar to Fig. 12 of still other apparatus for forming the product of the present invention.

Fig. 13 illustrates a still further form of device for practicing the present invention. In the form shown a belt 140 of polyvinyl alcohol or other suitable plastic is caused to be rapidly wiped across the surface of the supporting plate 142, leaving a deposited layer 144, the molecular orientation of which is in the direction indicated by the arrow 146. In the devices heretofore described employing rotating disks or the like, the area of contact between the support and the plastic coated thereon at the moment of coating is small. In the device shown in Fig. 13, where two spaced rotating disks 148 and 149 are employed as means for mounting plastic belt 140, the area of contact between the belt and the surface of the support 142 during the period of coating is relatively large. One of the two rotating disks, for example disk 148, may be a driven disk and the other, disk 149, an idler. If desired, supplemental elements not shown may be positioned between the two disks for lightly pressing the belt 140 against the surface of the support 142.

In Fig. 13 the entire width of the belt comes into contact with the surface of the supporting plate. In a modified form of this type of apparatus, shown in Fig. 14, the plate 150 is inclined to the surface of the belt and the surface of the rotating disks so that an edge only of the belt 152 comes in contact with the surface of the supporting plate. It will of course be understood that the supporting plate may be moved relatively back and forth beneath the belt until the entire surface of the plate is covered with the desired molecularly oriented plastic film.

Figure 14:
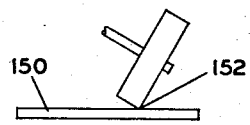
Fig. 14 is a diagrammatic representation of a modification in the method of employing the apparatus shown in Fig. 13.

In Figs. 15 to 18 inclusive there are shown modified forms of belts for use in connection with the apparatus shown for example in Fig. 13 or Fig. 14. These forms correspond roughly to certain of the modified disk forms previously described.

Figure 15:
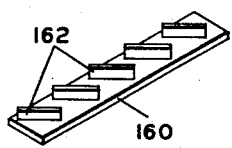
Figs. 15, 16, 17 and 18 are diagrammatic representations of modified forms of the belt means employed in connection with the device shown in Figs. 13 and 14.

In Fig. 15 for example, a belt 160 is shown having flaps 162 of the plastic material mounted therein, the flaps being angularly positioned so that as the belt is moved across the surface of the supporting plate, a wiping or smearing action will be obtained from the flap elements 162, such as was obtained for example from the flaps 32 shown in Fig. 3. It will be understood that the belt 160 may be made of the plastic material forming the flaps 162 or it may be made of any other suitable material such for example as fibre, leather or the like, in which the flaps may be mounted.

Figure 16:
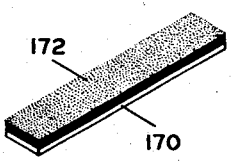

In Fig. 16 there is illustrated a belt element 170 having a multiplicity of relatively short, stiff bristles of polyvinyl alcohol or other suitable plastic 172 embedded therein.

Figure 17:
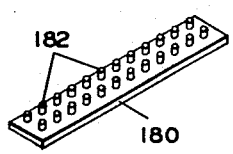
Figure 18:
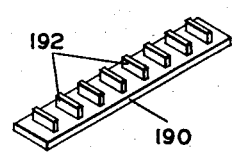

In Fig. 17 there is illustrated a belt element 180 having pegs of the plastic material 182 embedded therein, and in Fig. 18 there is illustrated a belt element 190 having flaps of the plastic material 192 embedded therein, the flaps being positioned substantially perpendicularly to the edges of the belt.

All these and other modifications may be satisfactorily employed in connection with apparatus such as is disclosed generally in Fig. 13 or Fig. 14.

Figure 19:
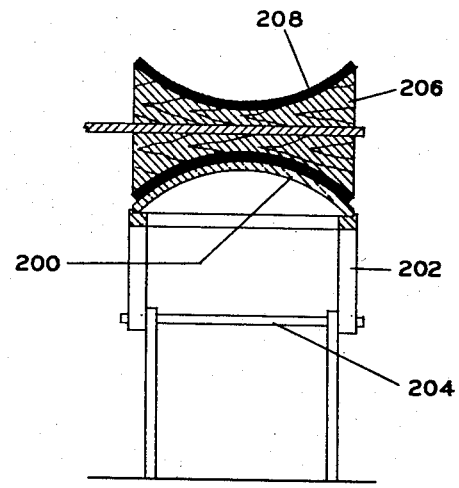
Figs. 19 and 20 are diagrammatic representations in front and side elevation with parts shown in section of one form of apparatus for forming the product of the present invention on a spherically curved support.
Figure 20:
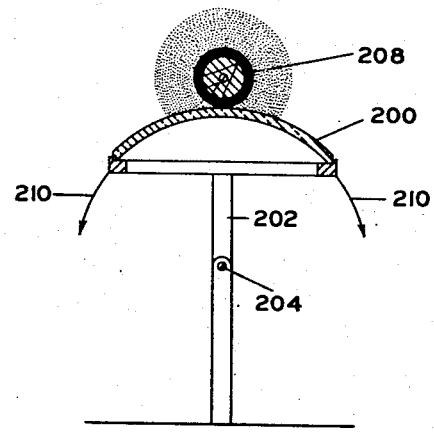

As has been pointed out, the present invention is admirably adapted for the coating of curved and more specifically spherically curved surfaces. In Figs. 19 and 20 there is illustrated diagrammatically means for accomplishing the coating of such a spherically curved surface as the outer surface of a modern automobile headlight lens, for example. In these figures 200 represents the curved lens, the outer surface of which is to be coated with the oriented plastic layer. The lens is preferably mounted in any suitable frame 202 in such a way that the lens may be rotated about an axis 204 passing through the center of curvature of the lens. 206 represents generally a driven brush element having its outer surface shaped to conform to the curvature of the outer surface of the lens 200 and having mounted in its outer surface a multiplicity of bristles, pegs, flaps or the like 208 of polyvinyl alcohol or other suitable plastic.

Fig. 19 represents a front sectional view of the brush in contact with the surface of the lens and Fig. 20 represents a side sectional view at about the center of the brush. With a structure of this kind, as the brush is rapidly rotated it leaves a deposit of oriented plastic material over the entire width of the curved lens and as the lens itself is swung in an arc about its center of curvature, as indicated by the arrows 210, its entire surface will be covered with the oriented plastic layer.

It will be apparent that means other than the brush 206 may be employed to coat a spherical, or curved surface. Devices such as are shown in Figs. 13 to 18 inclusive may be employed, and Figs. 21 and 22 illustrate means for utilizing such devices.

In Fig. 21, 220 represents a spherically curved support which is to be coated, 222 represents the coating belt or similar element, 224 the driven disk or pulley, and 226 an idler pulley for mounting and positioning the belt 222 so that it bears against a portion of the surface of the supporting plate 220, as for example at 228. The element 220 to be coated is mounted in means shown generally as at 230 in such a way that the element 220 may be rotated about its center of curvature 232 in two directions, about an axis 234 passing through the center of curvature of the lens and substantially parallel to the direction of travel of the belt 222, and about a second axis 236 also passing through the center of curvature of the lens and at right angles to the axis 234. As shown in Fig. 21, rotation about the axis 234 is effected by operation of the crank 238, and rotation about the axis 236 is effected by means of the handle 240, fixed to the lens mount. With such a device the entire surface of the lens may be covered with the oriented plastic film and the orientation of the film will be such that when it is converted into a light-polarizing film there will be no apparent shift in the transmission axis of the film over the entire surface of the lens.

Figure 22:
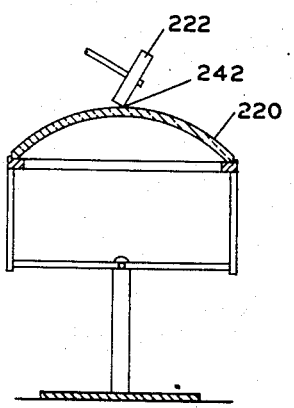
Fig. 22 is a diagrammatic illustration of a modified method of employing the apparatus shown in Fig. 21.

In Fig. 22 there is illustrated diagrammatically a modification of the device shown in Fig. 21 corresponding to the modification shown in Fig. 14. Here the belt 222 makes contact with the surface of the lens 220 along one edge of the belt, for example as at 242.

In Fig. 23 there is illustrated a modification of the device shown in Fig. 22, in which a rotating disk, for example a disk such as is shown in Figs. 2 to 11 inclusive, is substituted for the driven belt 222 of Fig. 22. This rotating disk is shown at 244 in Fig. 23.

In Fig. 24 there is illustrated mechanism for the production of a coating in which the molecular orientation of the deposited plastic is concentric about a predetermined point in the supporting plate. In this figure, 250 represents the supporting plate which is caused to rotate in a direction shown for example by the arrow 252, about a predetermined point 254. For example where the plate 250 is circular, the point 254 may be its center. The means for depositing a plastic, which is here shown in disk form, as at 256, is caused to rotate rapidly against the surface of the plate, and as the plate 250 rotates, a layer of deposited plastic, shown for example as at 258, is deposited thereon. The orientation of the molecules of this layer is in a direction illustrated by the arrow 260, and is circular and concentric about the point 254.

The rotating disk 256 may be moved in a direction illustrated by the arrow 262 along the radius of the circular area to be covered by the deposited plastic. If this is done, the entire surface of the disk 250, or so much thereof as is desired, may be covered by the deposited plastic layer. The same result may be accomplished by keeping the disk 256 in position and moving the rotating plate 250 beneath the disk in the direction shown by the arrow 262. It should be noted that the direction of relative motion of the disk 256 and the plate 250 is substantially along the axis of rotation of the element from which the plastic material is deposited.

In Fig. 25 there is illustrated apparatus for depositing a thin layer or film of oriented plastic material on the surface of a supporting plate in such a way that the molecules of the material are oriented in directions parallel to radii traversing a predetermined portion of the surface of the plate. In this figure the supporting plate is illustrated as at 270 and it is mounted for relatively slow rotation in the direction shown for example by the arrow 272. A rotating disk 274 of the type described or other means for depositing polyvinyl alcohol or other suitable plastic material upon the surface of element 270 is provided. It will be noted that the disk is so positioned that it deposits the oriented plastic material on the surface of plate 270 along a radius 276 traversing a point 278, for example the central point of the plate 270. The direction of orientation of the material deposited upon the plate 270 under these circumstances will be parallel to the radius 276. Means are provided, not shown, for moving the rotating disk or the plate 270 back and forth in a direction shown by the arrow 280 parallel to the radius 276. In this way, the entire surface of the disk 270 may be covered with the deposited plastic film and the direction of orientation of the molecules in the deposited film will be such as is illustrated by the arrows 282, i. e., parallel to radii traversing the point 278.

Devices of the type shown in Fig. 24 and in Fig. 25 are exceedingly useful. When the deposited oriented plastic film has been converted into a light-polarizing film, as hereinafter described, devices such as these may be used to great advantage in the production of striking advertising displays and the like. It should be understood, furthermore, that by controlling predeterminedly the position of the supporting plate with respect to the device from which the plastic film is deposited, any desired variation in direction of orientation of the deposited plastic film may be secured.

Speaking generally, since it is desirable that local heat be generated by friction at the point of contact between the plastic mass or masses from which the material is being deposited and the supporting plate on which the material is deposited, a preferred form of the invention contemplates the use of materials for the supporting plate which are poor conductors of heat. If, for example, the supporting plate is of glass, plastic material or the like, the frictional heat generated by the rapidly rotating disk or belt of plastic will be found sufficient generally to effect a satisfactory initial bonding of the deposited plastic film to the surface of the supporting plate.

Where the apparatus used in applying the plastic to the supporting plate or where the method of application employed is such that sufficient local heat is not generated to effect a satisfactory bond, or to cause the deposited flakes of plastic to coalesce, the supporting plate should be heated until the desired temperature is obtained.

The invention contemplates the further treatment of the deposited oriented plastic film or layer or a portion thereof to convert it into a light-polarizing film. A number of widely different polarizers may be produced by differently treating the oriented deposited plastic film or layer.

The product of the processes heretofore described may for example be converted into a light-polarizing film by applying to the oriented plastic film one or more dichroic stains or dyes which may be imbibed in the plastic film. Where the deposited film comprises polyvinyl alcohol the dichroic dye or dyes may be applied to it in the form of a water solution of the dye. A preferred dye or stain to be employed is a solution which provides a polarizing polyiodide. This may for example be a solution comprising iodine and an iodide which when present in the solution with iodine forms a stain comprising a polarizing polyiodide. Suitable iodides are ammonium iodide and sodium iodide. The application of a solution of this kind to the oriented deposited plastic film results in the formation therein of a dichroic stain, i. e., a stain which is substantially opaque to light vibrating in a predetermined direction, and more specifically the direction perpendicular to the direction of orientation of the molecules of the deposited plastic, and substantially transparent to light vibrating at right angles thereto.

Other dichroic dyes or stains may be employed such for example as the dichroic direct cotton dyes and more specifically such dyes as are of the azo type. By the selection of suitable dyes of this kind dichroic stains of any desired color may be produced, these stains being substantially transparent to light of a predetermined wavelength band when the light is vibrating in one direction and substantially opaque to the said light when it is vibrating in a direction at right angles thereto. It will be understood that two or more of these dichroic dyes may be employed and the resulting dichroic stain may, if proper dyes are selected, be a neutral stain, i. e., one which is substantially opaque for the entire visible spectrum to light vibrating in a predetermined direction and substantially transparent for the entire visible spectrum to light vibrating at right angles to said direction. All such modifications are to be deemed to fall within the scope of the present invention.

In forming light-polarizing films of the type described the dye or stain may be added to the film after it has been formed, or the polyvinyl alcohol, or other plastic employed in the formation of the deposited film, may have first been dyed or stained with the desired dichroic dye or stain, and the stained plastic may be employed as previously described as the plastic mass or units in the various forms of apparatus disclosed in the drawings as suitable for use in the practice of the invention. The preferred method, however, is to apply a dichroic dye or stain to the deposited plastic film after it has been formed.

The deposited film may be further heated after formation to insure permanent adhesion to the supporting plate. This is particularly true where the plate is of glass. The deposited film may be heated at a temperature above 100 degrees C. and below 175 degrees C. for a few minutes without alteration in its molecular orientation and a permanent bond is thus secured. Where the deposited film comprises a plurality of separately formed layers, it is preferred that each layer be baked before the addition thereto of the next superimposed layer.

The desirability of converting the deposited plastic film into a light-polarizing layer of the type described in United States Patent No. 2,173,304 has already been mentioned. Where such a polarizer is to be produced comprising a plurality of superimposed adherent layers of plastic film, it is preferred to convert each layer into a polarizing film before depositing thereon the next overlying layer.

Where this form of polarizer is to be produced the invention contemplates preferably the addition of a catalyst to the deposited oriented plastic film. The catalyst may be added to the film after it is formed or it may be added to the polyvinyl alcohol mass or masses from which the deposited film is produced. Suitable catalysts are small amounts of an acid such as sulphuric acid or hydriodic acid or of a salt such as ammonium iodide, ferric chloride or sodium bisulphate. With a catalyst of the character described in the film or plastic layer, heating to a temperature approximating 175 degrees C. or even less causes a conversion of some of the polyvinyl alcohol molecules into the dichroic molecules of polyvinylene described in the said United States patent.

With the thin films or layers employed in the present invention the concentration of the converted polarizing molecules within the deposited layer is relatively high and substantially complete polarization of transmitted light may be secured with films in the neighborhood of 0.00015 inch in thickness. It will be apparent that with such thin films of deposited plastic the loss of light by absorption of the transmitted component in the plastic layer is negligible and a highly efficient polarizing film is thus secured.

In one form of the invention the stain comprising ammonium iodide and iodine and heretofore described as producing a dichroic film when applied to the oriented polyvinyl alcohol layer may be used as a catalyst in connection with the production of a polarizer of the type described in United States Patent No. 2,173,304. Where this is done the oriented plastic film is first converted into a dichroic polarizer by staining with the iodine-iodide solution and the film is then heated in the neighborhood of 175 degrees C. or less so that the dichroic stain formed therein is driven off. The stain acts however as a volatile catalyst for the formation of polyvinylene molecules within the plastic film and hence as one dichroic stain is driven off another dichroic polarizer is produced.

The use of a catalyst which is used up or exhausted or driven off while the conversion into a light-polarizing film is taking place is preferred, for under these circumstances, after optimum conversion is reached, no darkening of the polarizing film will occur on further heating. The use of such volatile catalysts as those heretofore described also makes unnecessary the addition of an inhibitor such as is described in said United States Patent No. 2,173,304 in connection with the production of sheets of the polyvinylene polarizer.

When this type of polarizer is produced in the product of the present invention, it has been found desirable to immerse the polarizing film in water, preferably warm water, for example at a temperature of 70° C., for a few minutes. This treatment substantially eliminates such haze as may otherwise be imparted to a transmitted beam by the polarizing film.

While glass has been described generally as a preferred supporting plate or element to receive the deposited oriented plastic film, it is to be understood that any suitable support may be employed. Plastic sheets, for example such as cellulose acetate, cellulose nitrate, gelatin, urea formaldehyde resins, polyvinyl acetal, ethyl cellulose, regenerated cellulose and polyvinyl alcohol have all been satisfactorily used. So also the support need not be transparent. Mirror or reflecting surfaces have been satisfactorily coated in the manner heretofore described. All such embodiments are to be deemed to fall within the scope of the invention.

In the production of the deposited film of oriented plastic material varying conditions may be employed. The speed of rotation or motion against the support of the elements from which the plastic is deposited and the speed of motion of the support past the depositing elements may, for example, be widely varied. So also, wide differences in the pressures employed between the supporting plate and the element or elements from which the plastic is deposited may be used. Speaking generally, the pressure employed should preferably be such as to generate sufficient local heat to cause adhesion of the plastic film to the support under the conditions in which the film is supplied. But the pressure should not be so great as to cause the generation of so high a heat that the deposited layer is disoriented. A preferred process is one in which a relatively light force is employed and in which the plastic is brought into contact with the supporting plate at speeds ranging from approximately 1000 feet a minute to 2500 feet a minute while the supporting plate is moved relatively to the rotating belt or disk at speeds varying from 10 to 75 feet per minute. It will be understood that these measurements are illustrative only and that they may be widely departed from under certain conditions and where the production of special type film is desired.

The deposited layer or film of plastic material of the present invention may not readily be removed from its supporting plate. Presumably because the film is so thin and/or because it has been formed in the manner described, i. e., by the successive deposition of contiguous flakes of plastic of exceeding thinness and small surface area, attempts to strip or peel the deposited film from its support usually result only in the tearing away of a minute portion of the film. The film therefore may be described as a non-peeling film or layer and such description will be understood as implying that relatively large areas of the film may not be stripped or peeled from the supporting plate.

It has already been pointed out that a principal object of this invention is the provision of a method for uniformly coating a non-planar surface such for example as a spherically curved surface with a plastic which may be converted into a dichroic light-polarizing film and the provision of a method of forming the said coating in such a way that the molecules thereof will be so oriented that light traversing the said coating and the supporting plate will be polarized to vibrate substantially parallel throughout the entire portion of the transmitted beam. It is intended that a principal application of the process of the present invention shall be the coating of the outer surface of the lens of the so-called sealed beam automobile headlight. This lens is spherically curved and the apparatus illustrated diagrammatically in Figs. 21, 22 and 23 is intended primarily for use in connection with the coating of the so-called sealed beam headlight lenses. In connection with supporting devices of this kind, the apparatus diagrammatically shown in Figs. 21, 22 and 23 permits the deposition of a plastic layer or film on a support in such a way that the flakes of deposited plastic material are laid down on the support in the form of a multiplicity of narrow, partially overlying, coalesced, molecularly oriented bands of plastic, the bands being of substantially equal width and being parallel with each other. Where the lens is spherically curved, as in the case of the sealed beam headlight, each band of plastic deposited on the surface of the lens may be considered as including and being parallel with the curve formed on the surface of the lens by the intersection therewith of a plane parallel with a predetermined plane traversing the center of curvature of the lens.

It will of course be understood that the present invention is to be deemed to cover the coating of non-planar and particularly spherically curved surfaces in other ways than that just described.

Furthermore it will be understood that the invention relates to the coating of such curved surfaces as the surfaces of lenses and more specifically ophthalmic lenses. It has for example been difficult to produce a prescription lens provided with light-polarizing material to render it adapted to block reflected glare so that it might be employed for example in connection with sun-glasses or the like. The present invention contemplates the coating of such prescription lenses in the manner heretofore described with a thin, molecularly oriented plastic film and the conversion of the film into a light-polarizing layer. It will of course also be understood that optically flat glass such as glass now employed in the manufacture of certain sunglasses may be coated in the manner described with a thin oriented plastic layer, which may then be converted into a light-polarizing layer or film. Such lenses are admirably adapted for use in sunglasses, particularly where the polarizing film is so oriented as to block horizontally vibrating light.

In connection with such devices and others falling within the scope of the invention, it may be desirable to cover the light-polarizing film or oriented plastic film with a suitable cover plate or protective layer. A thin layer of glass, which may be curved to conform to the coated lens surface where that surface is curved, may for example be employed and the lamination may be effected by any suitable laminating material such for example as the material sold under the trade name "Plexigum" or polyvinyl alcohol or a plasticized incomplete polymerized polyvinyl acetal or the like, or the coating on the surface of the plastic film may be a resinous coating, for example a material such as that sold under the trade name "Polymerin."

In certain embodiments of the invention, the deposited plastic film or layer may be of such thickness and birefringence as to function as a predetermined fractional wave retardation plate, such for example as a quarter-wave retardation plate. Speaking generally, where it is desired that a retardation plate be formed, it is necessary only to build up the thickness of the deposited film until the desired retardation is secured. A specific example of the use of such a process in connection with the present invention would be the deposition of additional plastic on the exposed surface of the light-polarizing layer formed on an automobile headlight lens, for example, the additional plastic being so deposited that its direction of orientation is substantially at 45 degrees to the direction of orientation of the plastic forming the light-polarizing layer, and the supplemental plastic layer being of such thickness as to form a quarter-wave retardation plate which would be coalesced with and permanently superimposed upon the underlying light-polarizing film. Under these circumstances the headlight would be adapted to emit circularly polarized light and would be useful in connection with headlight glare elimination systems employing circularly polarized light.

It will also be apparent that in the formation of laminations from products of the present invention it may be desirable to laminate together two coated supporting plates with their coated surfaces adjacent and, for example, with the molecules of the coated surfaces oriented to substantial parallelism. If the coated surfaces have been converted into light-polarizing films, such a lamination permits the use of somewhat thinner deposited films than with an unlaminated product as the polarizing properties of one film may be employed to supplement those of the other film.

While the product of the present invention has previously been described as a non-peeling layer or film and while it has been pointed out that only small areas of the product may be removed by peeling, it should perhaps be mentioned that the product of the present invention shows a somewhat greater tendency to peel in one direction than in another direction. The direction in which it shows a slight tendency to peel is substantially parallel with the direction of orientation of the molecules of the plastic film and opposite to, or at an angle of 180 degrees to, the direction of the application of the frictional force which caused the deposited particles of the plastic film to coalesce. In this sense therefore, and insofar as the product of the present invention shows any tendency to peel, that tendency is unidirectionally anisotropic.

The particles of the plastic deposited on the supporting plate in the process of the present invention have heretofore been described as "flakes." It will of course be understood that the shape and character of the deposited particles may vary widely with the use of different forms of applicators. These particles may be relatively broad or they may be long and filament-like. The use of the word "flake" in the specification and claims will be understood as covering the deposited particle irrespective of its shape.

Since certain changes in carrying out the above process, and certain modifications in the product which embody the invention may be made without departing from its scope, it is intended that all matter contained in the above description or shown in the accompanying drawings shall be interpreted as illustrative and not in a limiting sense.

It is also to be understood that the following claims are intended to cover all the generic and specific features of the invention herein described, and all statements of the scope of the invention which, as a matter of language, might be said to fall therebetween.

Having described my invention, what I claim as new and desire to secure by Letters Patent is:

1. A light polarizer comprising a supporting plate and a thin dichroic layer thereon of a linear, hydrophilic, high polymeric plastic material having its molecules substantially oriented, said layer comprising a plurality of superimposed dichroic films bonded together and separately formed in situ upon said supporting plate.

2. A light polarizer comprising a supporting plate and a thin dichroic layer thereon of a linear, hydrophilic, high polymeric plastic material having its molecules substantially oriented, said layer comprising a plurality of superimposed dichroic films bonded together and separately formed in situ upon said supporting plate, the total thickness of said layer not exceeding 0.0002 inch.

3. A light polarizer comprising a supporting plate and a thin dichroic layer thereon of a linear, hydrophilic, high polymeric plastic material having its molecules substantially oriented, said layer comprising a plurality of superimposed dichroic films bonded together and separately formed in situ upon said supporting plate, each of said films comprising a multiplicity of contiguous separately formed areas of said plastic material.

4. A light polarizer comprising a supporting plate of a material which is a poor conductor of heat and a thin dichroic layer thereon of a linear, hydrophilic, high polymeric plastic material having its molecules substantially oriented, said layer comprising a plurality of superimposed dichroic films bonded together and separately formed in situ upon said supporting plate.

5. In a process of forming a thin light-polarizing layer of a thermoplastic plastic material from the class consisting of the light-transmitting, linear, high polymeric plastics the molecules of which contain hydroxyl groups, and wherein the said layer is formed on a support, the steps comprising bringing a mass of said plastic into repeated, moving, frictional contact with said support to apply to the support a multiplicity of particles of said plastic, said step simultaneously orienting the molecules of said particles and causing said particles to coalesce and form a layer and to adhere to said support, and subjecting the plastic material comprising said particles to a treatment at one step in the process which renders the said material dichroic.

6. In a process of forming a thin light-polarizing layer of a thermoplastic plastic material from the class consisting of the light-transmitting, linear, high polymeric plastics the molecules of which contain hydroxyl groups, and wherein the said layer is formed on a support, the steps comprising bringing a mass of said plastic into repeated, moving, frictional contact with said support to apply to the support a multiplicity of particles of said plastic, said step simultaneously orienting the molecules of said particles and causing said particles to coalesce and form a layer and to adhere to said support, and applying to said layer, after it is formed, a material from the class consisting of the dichroic dyes and stains whereby said layer is rendered dichroic.

7. In a process of forming a thin light-polarizing layer of a thermoplastic plastic material from the class consisting of polyvinyl alcohol and polyvinyl acetal, and wherein the said layer is formed on a support, the steps comprising bringing a mass of said plastic into repeated, moving, frictional contact with said support to apply to the support a multiplicity of particles of said plastic, said step simultaneously orienting the molecules of said particles and causing said particles to coalesce and form a layer and to adhere to said support, subjecting the plastic material comprising said particles to a treatment at one step in the process which renders the said material dichroic, and heating said deposited layer to form therein molecules of polyvinylene whereby said layer becomes dichroic.

8. In a process of forming a thin light-polarizing layer of a thermoplastic plastic material from the class consisting of polyvinyl alcohol and polyvinyl acetal, and wherein the said layer is formed on a support, the steps comprising bringing a mass of said plastic into repeated, moving, frictional contact with said support to apply to the support a multiplicity of particles of said plastic, said step simultaneously orienting the molecules of said particles and causing said particles to coalesce and form a layer and to adhere to said support, subjecting the plastic material comprising said particles to a treatment at one step in the process which renders the said material dichroic, heating said deposited layer to form therein molecules of polyvinylene whereby said layer becomes dichroic, and thereafter immersing said layer in warm water for a short period.

9. The process of forming a light-polarizing layer on a supporting plate which comprises depositing on said support a multiplicity of contiguous areas of polyvinyl alcohol by bringing a mass of polyvinyl alcohol into repeated, moving, frictional contact with said support, said step simultaneously orienting the molecules of said areas to substantial parallelism and causing said areas to coalesce to form a unitary layer bonded to said support, and heating said deposited layer to convert portions thereof to a dichroic reaction product of polyvinyl alcohol.

10. The process of forming a light-polarizing layer on a supporting plate which comprises depositing on said support a multiplicity of contiguous areas of polyvinyl alcohol by bringing a mass of polyvinyl alcohol into repeated, moving, frictional contact with said support, said step simultaneously orienting the molecules of said areas to substantial parallelism and causing said areas to coalesce to form a unitary layer bonded to said support, and heating said deposited layer in the presence of an accelerator comprising a dichroic stain to convert molecules thereof into molecules of polyvinylene.

11. In a process of forming a thin light-polarizing layer of a thermoplastic plastic material from the class consisting of polyvinyl alcohol, and polyvinyl acetal, and wherein said layer is formed on a support, the step comprising heating said support, bringing a mass of said plastic into repeated, moving, frictional contact with said heated support to apply to the support a multiplicity of particles of said plastic, said last-named step simultaneously orienting the molecules of said particles and causing said particles to coalesce and form a layer and to adhere to said support, and subjecting the plastic material comprising said particles to a treatment at one step in the process which renders said material dichroic.

12. In a process of forming a thin birefringent layer of a thermoplastic plastic material from the class consisting of the light-transmitting, linear, high polymeric plastics, and wherein said layer is formed on a support, the step comprising bringing a mass of said plastic into repeated, moving, frictional contact with said support to apply to the support a multiplicity of particles of said plastic, said step simultaneously orienting the molecules of said particles and causing said particles to coalesce and form a layer and to adhere to said support.

13. In a process of forming a thin birefringent layer of a thermoplastic plastic material from the class consisting of polyvinyl alcohol and polyvinyl acetal, and wherein said layer is formed on a support, the step comprising bringing a mass of said plastic into repeated, moving, frictional contact with said support to apply to the support a multiplicity of particles of said plastic, said step simultaneously orienting the molecules of said particles and causing said particles to coalesce and form a layer and to adhere to said support.

14. The process of forming a birefringent layer on a supporting plate which comprises bringing a mass of polyvinyl alcohol into repeated, moving, frictional contact with said support to apply to the support a multiplicity of particles of said polyvinyl alcohol, said step simultaneously orienting the molecules of said particles and causing said particles to coalesce and form a layer and to adhere to said plate.

15. In a process of forming a birefringent layer of a thermoplastic plastic material from the class consisting of polyvinyl alcohol and polyvinyl acetal, and wherein said layer is formed on a support, the steps comprising heating said support, and bringing a mass of said plastic into repeated, moving, frictional contact with said heated support to apply to the support a multiplicity of particles of said plastic, said last-named step simultaneously orienting the molecules of said particles and causing said particles to coalesce and form a layer and to adhere to said support.

16. As a new article of manufacture, an exceedingly thin plastic sheet comprising a multiplicity of contiguous and at least partially coalesced flakes of a linear, high polymeric plastic material, the molecules of each of said flakes being oriented in substantially uniform relation with each other and with the molecules of adjacent flakes.

17. As a new article of manufacture, an exceedingly thin plastic sheet comprising a multiplicity of contiguous and at least partially coalesced flakes of polyvinyl alcohol, the molecules of each of said flakes being oriented in substantially uniform relation with each other and with the molecules of adjacent flakes.

18. In combination, means providing a supporting surface, and an exceedingly thin plastic film bonded to said surface, said film comprising a multiplicity of contiguous and at least partially coalesced flakes of a linear, high polymeric plastic material, the molecules of each of said flakes being oriented in substantially uniform relation with each other and with the molecules of adjacent flakes.

19. In combination, means providing a supporting surface, and an exceedingly thin plastic film bonded to said surface, said film comprising a multiplicity of contiguous and at least partially coalesced flakes of a linear, high polymeric plastic material, the molecules of said plastic material being oriented substantially concentrically about a point in said film.

20. In combination, means providing a supporting surface, and an exceedingly thin plastic film bonded to said surface, said film comprising a multiplicity of contiguous and at least partially coalesced flakes of a linear, high polymeric plastic material, the molecules of said plastic material being oriented substantially radially from a point in said film.

21. In combination, means providing a substantially rigid supporting surface, and an exceedingly thin plastic film bonded to said surface and in direct contact therewith, said film comprising a multiplicity of contiguous flakes of a linear, high polymeric plastic material at least partially coalesced and forming a non-peeling film, the molecules of each of said flakes being oriented in substantially uniform relation with each other and with the molecules of adjacent flakes.

22. In combination, means providing a supporting surface, and an exceedingly thin plastic film bonded to said surface, said film comprising a multiplicity of contiguous and at least partially coalesced flakes of polyvinyl alcohol, the molecules of each of said flakes being oriented in substantially parallel relation with each other and with the molecules of adjacent flakes.

23. A light polarizer comprising an exceedingly thin plastic sheet comprising a multiplicity of contiguous and at least partially coalesced flakes of a linear, high polymeric plastic material, the molecules of each of said flakes being oriented in substantially parallel relation with each other and with the molecules of adjacent flakes, said sheet having distributed therethrough dichroic material oriented in substantially the same directions as the molecules of said flakes.

24. A light polarizer comprising an exceedingly thin plastic sheet comprising a multiplicity of contiguous and at least partially coalesced flakes of a polyvinyl alcohol, the molecules of each of said flakes being oriented in substantially parallel relation with each other and with the molecules of adjacent flakes, said sheet having distributed therethrough dichroic material oriented in substantially the same directions as the molecules of said flakes.

25. A light polarizer comprising in combination, means providing a supporting surface, and an exceedingly thin plastic film bonded to said surface, said film comprising a multiplicity of contiguous and at least partially coalesced flakes of a linear, high polymeric plastic material, the molecules of each of said flakes being oriented in substantially parallel relation with each other and with the molecules of adjacent flakes, said sheet having distributed therethrough dichroic material oriented in substantially the same directions as the molecules of said flakes.

26. A light polarizer comprising, in combination, means providing a substantially rigid supporting surface, and an exceedingly thin plastic film bonded to said surface and in direct contact therewith, said film comprising a multiplicity of contiguous, coalesced flakes of polyvinyl alcohol, the molecules of each of said flakes being oriented in substantially parallel relation with each other and with the molecules of adjacent flakes, said sheet having distributed therethrough dichroic material oriented in substantially the same directions as the molecules of said flakes.

27. A light polarizer comprising, in combination, means providing a substantially rigid supporting surface, and an exceedingly thin plastic film bonded to said surface and in direct contact therewith, said film comprising a multiplicity of contiguous, coalesced flakes of polyvinyl alcohol, the molecules of each of said flakes being oriented in substantially parallel relation with each other and with the molecules of adjacent flakes, said film being dichroic and deriving its dichroism essentially from molecules of polyvinylene distributed therethrough and oriented in substantially the same directions as the molecules of said flakes.

28. A light polarizer comprising, in combination, means providing a substantially rigid, spherically curved supporting surface and an exceedingly thin plastic film bonded to said surface and in direct contact therewith, said film comprising a multiplicity of contiguous flakes of polyvinyl alcohol coalesced and forming a substantially non-peeling film, the molecules of each of said flakes being oriented in substantially parallel relation with each other and with the molecules of adjacent flakes, said sheet having distributed therethrough dichroic material oriented in substantially the same directions as the molecules of said flakes.

29. A light polarizer comprising, in combination, means providing a substantially rigid, spherically curved supporting surface and an exceedingly thin plastic film bonded to said surface and in direct contact therewith, said film comprising a multiplicity of contiguous flakes of polyvinyl alcohol coalesced and forming a substantially non-peeling film, the thickness of said film not substantially exceeding 0.0002 inch, the molecules of each of said flakes being oriented in substantially parallel relation with each other and with the molecules of adjacent films, said film being dichroic and deriving its dichroism essentially from molecules of polyvinylene distributed therethrough and oriented in substantially the same directions as the molecules of said flakes.

HOWARD G. ROGERS.